July 2, 1957  J. HAMBERGER  2,797,471
TOOL
Filed April 19, 1954  2 Sheets-Sheet 1
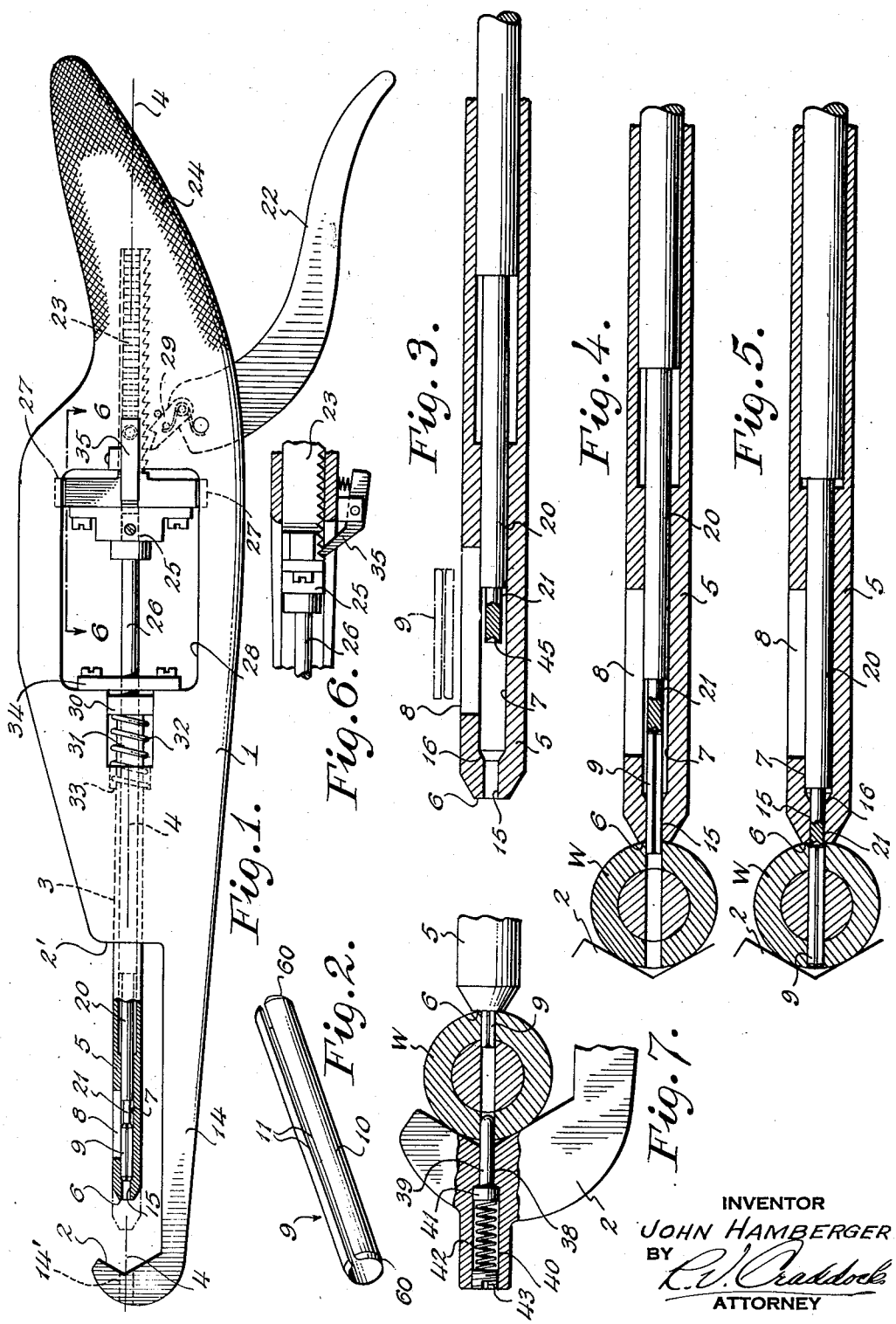
INVENTOR
JOHN HAMBERGER
BY
C. V. Craddock
ATTORNEY July 2, 1957
J. HAMBERGER
2,797,471
TOOL
Filed April 19, 1954
2 Sheets-Sheet 2
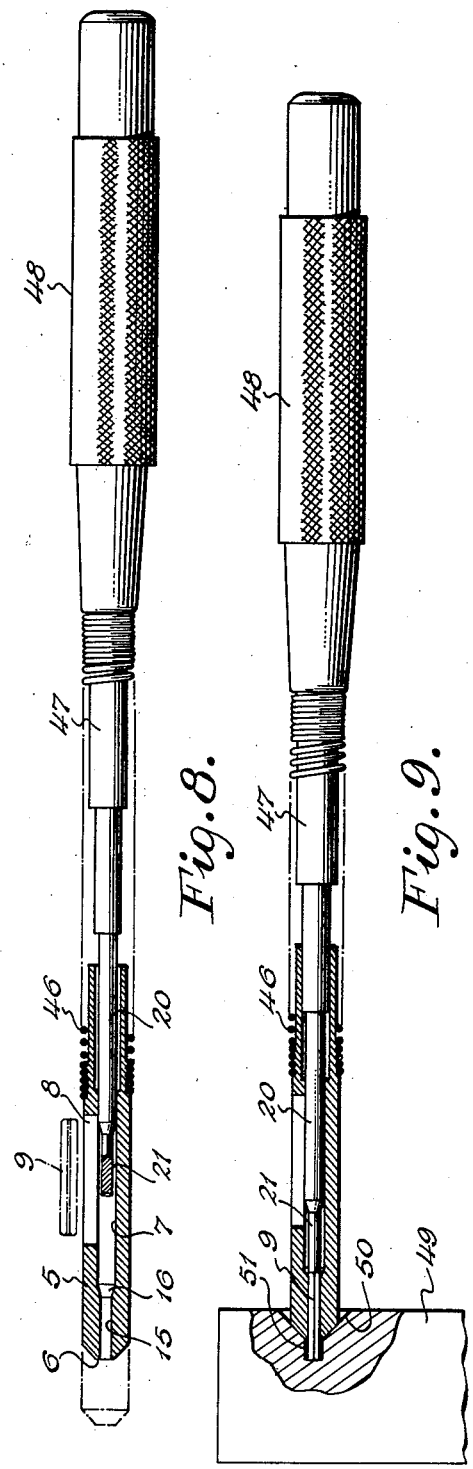

United States Patent Office 2,797,471
Patented July 2, 1957

2,797,471

TOOL

John Hamberger, Richmond Hill, N. Y., assignor to Sperry Rand Corporation, a corporation of Delaware Application April 19, 1954, Serial No. 424,057

3 Claims. (Cl. 29—268)

This invention relates generally to hand tools, and more specifically to a hand tool for inserting a fastening pin of the resilient, compressible-diameter type, sometimes referred to as roll pins, into corresponding holes in machine parts for the purpose of fastening or securing said parts together.

Pins of this type may be used in place of the common taper pins and are used, for example, in fastening gear hubs to shafts, shafts to shafts, shafts to casings, and the like. Such pins are made of spring material and are so designed that when inserted into the holes of the machine parts they are compressed along their diameter and therefore exert considerable pressure on the inside surface of the holes, thus keeping the parts tightly in place. In other words, the holes in the parts of an apparatus which it is desired to fasten together are of a diameter slightly less than the uncompressed diameter of the pins. However, in the past it has been difficult to insert the pins into their corresponding holes without damaging other parts of the machine during the inserting operation or without damaging the pin-receiving holes themselves.

The tool of the present invention is designed to permit convenient and simple insertion of pins of the above type into machine parts without in any way damaging other elements of an assembly. The tool is so designed that the force required to compress the pin for insertion into their corresponding holes in the machine parts to be fastened together is in no way transmitted to the part itself or to other machine parts in the apparatus.

Generally, the tool comprises a shaft which may be aligned with the holes in the machine parts, which shaft has a first internal longitudinal bore therein having a diameter substantially equal to the uncompressed diameter of the pin and adapted to receive the pin therewithin. At the discharge end of the shaft, adapted for positioning adjacent the machine part or work piece, there is a second bore concentric with the first bore and communicating therewith. This second bore has a diameter substantially equal to the fully compressed diameter of the pin. Translatably fitted within the first internal bore is a push rod which has at least an end portion thereof of a diameter substantially equal to the diameter of the second bore. Upon translation of the push rod toward the part-engaging end of the shaft, the rod engages the pin lying within the first bore so that the push rod will force the pin into the second bore and thereby force the same into its fully compressed state. Continued translation of the push rod will insert the pin, in its fully compressed state, into the corresponding holes in the machine parts and as the pin is forced out of the small diameter bore it will spring toward its uncompressed state and thereby exert considerable force on the internal walls of the holes in the machine parts, thus firmly securing the parts together.

The principal object of the present invention, therefore, is to provide a novel hand tool for inserting resilient, compressible-diameter type pins into their corresponding holes in machine parts for the purpose of fastening said parts together, wherein the force required for so inserting said pins does not react on other parts of the apparatus.

Another object of the present invention is to provide a hand tool of the above character in which the resilient, compressible-diameter type pins are fully compressed before insertion thereof into their corresponding holes.

Other objects and advantages of the hand tool of the present invention will become clearly apparent from the following detailed description of exemplary embodiments thereof described below in conjunction with the accompanying drawings, wherein:

Fig. 1 is a side elevation view, partly in section, of a tool constructed in accordance with the teachings of the present invention;

Figs. 2 and 2A are perspective views of two different types of resilient, compressible-diameter type pins adapted for use with the tool of the present invention;

Figs. 3, 4 and 5 are sectional views of a portion of the tool of the present invention illustrating the manner of operation thereof;

Fig. 6 is a fragmentary, sectional view of a detail of the tool illustrated in Fig. 1, taken generally in the plane 6—6 thereof;

Fig. 7 is a fragmentary view, partly in section, illustrating a modification of the embodiment of the tool of the present invention illustrated in Fig. 1;

Fig. 8 is a view illustrating a further modification of a tool built in accordance with the teachings of the present invention; and Figs. 9 and 10 are views of the tool shown in Fig. 8 illustrating the manner of operation thereof.

In Fig. 1 there is shown a preferred embodiment of a tool constructed in accordance with the present invention. Reference character 1 designates the main tool body portion which includes, generally, a C-shaped frame or work engaging portion 14 and a handle or actuator portion 24. One end of C-shaped portion 14 forms a V-shaped anvil 2 and the other part 2' thereof is provided with a bore 3. The V-shaped anvil 2 is adapted to receive the work or machine parts W (Figs. 4 and 5) which are to be fastened together with the pin receiving holes therein aligned with the bore 3. Bore 3 extends longitudinally of C-shaped frame 14 and anvil 2 and lies concentric with the longitudinal axis 4 thereof. Slidably fitted within bore 3 is a shaft 5 arranged to be axially adjustable along the axis 4 toward anvil 2. A tapered end portion 6 is adapted to engage the machine part lying against anvil 2 into the holes of which the compressed diameter pins are to be inserted. Shaft 5 is provided with a first internal bore 7 having a diameter substantially equal to the uncompressed diameter of the pin and adapted to receive the pin therewithin and extending along the entire length of shaft 5 but terminating just short of the work-engaging end 6 thereof. An elongated slot 8 is provided adjacent or near the work-engaging end 6 of shaft 5 and serves to guide a compressed-diameter pin into the internal bore 7.

In Figs. 2 and 2A there are illustrated two typical forms of resilient, compressed-diameter pins which the tool of the present invention is particularly designed to handle. However, it will be understood that other types of compressible-diameter pins may also be equally well handled by this tool. The pin 9 illustrated in Fig. 2 comprises a discontinuous cylinder 10 of spring material such as, for example, a high grade spring steel. Such pins, of course, are available in various lengths and diameters depending upon the specific requirements of the machine parts which it is desired to fasten together and it will be understood that the dimensions of the tool of the present invention may likewise be varied accordingly. The sizes have been standardized and so designed that for a given size hole in the machine parts to be fastened, the uncompressed diameter of the pins are slightly larger than the diameter of the holes whereby when they are placed therewithin the pins exert considerable pressure on the inside walls of the holes, thus keeping the parts tightly fastened or secured together. However, the dimension between the unclosed ends 11 of cylindrical pin 9 is such that the pin may be compressed to a diameter that is slightly smaller than the holes into which they are to be inserted.

The fastening pin 12 illustrated in Fig. 2A is of slightly different form than that illustrated in Fig. 2 and is sometimes referred to as a spiral pin. As its name suggests, spiral pin 12 comprises a sheet of high grade spring steel which has been rolled into a generally cylindrical shape. However, the ends of the sheet, as contrasted to the pin 9 of Fig. 2, are overlapping as at 13 to a considerable extent. As in the case of pin 9, the diameter of spiral pin 12 may be compressed inasmuch as the overlapping ends thereof may slide over each other. Both pins 9 and 12 are preferably tapered at each end thereof as illustrated at 60.

Extending from the work-engaging end 6 of shaft 5 and concentric with the first internal bore 7, is a second internal bore 15 which is in communication with the first internal bore 7. The diameter of this second bore is substantially equal to the fully-compressed diameter of the pin 9. Preferably, and in the embodiments illustrated in Figs. 1 and 8 of the present invention, a tapered bore section 16 connects the first and second internal bores 7 and 15.

Slidably fitted within bore 7 and shaft 5 is a push rod 20 which has a diameter substantially equal to the diameter of the first internal bore 7 and an end portion 21 of push rod 20 is of a reduced diameter substantially equal to the diameter of the second internal bore 15 in the work-engaging, discharge end 6 of shaft 5 and is adapted to engage the pin 9 lying within internal bore 7 as shown in Fig. 1.

In Fig. 1 means are shown for imparting translational movement to the push rod 20 which means comprises a linear or straight ratchet 23 mounted within handle member 24 and adapted to be secured, as by means of hub 25, to the other end 26 of push rod 20. Hub 25 is provided with guides 27 adapted to slide along the internal parallel walls 28 formed in the main tool body 1. Pivotally mounted on handle 24 is a ratchet actuating handle 22 having a pawl 29 pivotally mounted thereon for engagement with ratchet 23. Actuating handle 22 is preferably spring loaded to its open position with respect to handle 24 by means of a suitable spring now shown. Therefore, as pliers-like handles 24 and 22 are forced together, pawl 29 will engage ratchet 23 and will forcibly translate push rod 20 toward the machine parts to be secured together as will be further described.

It is desirable after pin 9 has been inserted into internal bore 7 through guide slot 8 that it be initially urged against tapered bore section 16 to thereby retain pin 9 within the bore to facilitate handling of the tool prior to the insertion operation. For this purpose, a shoulder 30 is provided on the opposite end 31 of shaft 5 which forms an abutment for one end of a suitable compression spring 32, the other end of which abuts a shoulder 33 in the handle 24. Thus, spring 32 forces shoulder 30 and hence shaft 5 toward handle 24 and therefore pin 9 is held in place within bore 7 with one end against tapered bore section 16 and the opposite end against end portion 21 of push rod 20. The plate 34 secured to the internal opening in tool body portion 1 provides a stop for the shoulder 30 and limits movement of shaft 5 toward handle 24. A ratchet lock 35 shown in Fig. 6 prevents movement of push rod 20 by compression spring 32 toward the handle 24 during a pin insertion operation.

It will be noted that the pawl 29 in its normal unactuating position on handle 22 does not engage ratchet 23 but is held clear thereof by means of a suitable pin fixed in handle portion 24. However, when actuating handle 22 is squeezed toward handle 24 pawl 29 is so arranged that as it moves forward, it will engage ratchet 23 and thus force push rod 20 forward toward work W. Upon release of handle 22 ratchet lock 35 (Fig. 6) will prevent movement of push rod 20 toward handle 24 under compression of spring 32.

In Fig. 7 there is shown a modification of the anvil 2 illustrated in Fig. 1. This modification is for the purpose of facilitating the alignment of the holes in the machine parts W with the axis 4 of the tool. For this purpose, the anvil is provided with bore 38 into which a guide pin 39 is slidably fitted. A larger bore 40 accommodates the head 41 of pin 39. A spring 42 urges guide pin 39 to its fully extended position so that the holes in the work W may be guided thereon. A threaded stop nut 43 forms an abutment in the bore 40 for compression spring 42.

The operation of the embodiment of the tool of the present invention illustrated in Fig. 1 will now be described in connection with the insertion of a roll pin 9 into corresponding holes in machine parts W of Figs. 4 and 5, which, in this example, comprise a pair of interfitting shafts. The operator inserts pin 9 into the first internal bore 7 by pulling shaft 5 toward anvil 2 (as shown by dotted lines in Fig. 1) against compression spring 32. Such movement brings elongated guide slot 8 to a position beyond end portion 21 of push rod 20 so that pin 9 may be fitted into internal bore 7. The operator now releases shaft 5 allowing the same to move along axis 4 away from anvil 2 due to the compression spring 32 thereby clamping the ends of pin 9 between tapered bore section 16 and end portion 21 of push rod 20. Now the operator may freely handle the tool without the pin falling out. He now hooks V-shaped anvil 2 around the work W in such a manner that the holes are in alignment with the axis 4 of the tool. As explained in connection with Fig. 7 this alignment may be facilitated by guide pin 39. With the tool so in place relative to the work W, the operator now grasps handles 24 and 22 in pliers-like fashion and squeezes the handles together thereby imparting a translatory motion to push rod 20 toward anvil 2. It will be understood that prior to engagement of the end 6 of shaft 5 with the work W both push rod 20 and shaft 5 will move together under the influence of compression spring 32. Upon engagement of the end 6 with the work W motion of shaft 5 toward the work will, of course, be arrested. However, continued pressure upon push rod 20 by means of handles 22 and 24 will cause pin 9 to be forced from its uncompressed state into bore 15 to its fully compressed state. Such compression of the diameter of pin 9 is facilitated by tapered bore section 16, and, of course, since the ends 60 of most pins of this type are also tapered, compression thereof is further facilitated. Continued motion of shaft 20 will carry pin 9 in its compressed state into the holes in work W, as clearly shown in Figs. 4 and 5.

At this point it should be pointed out that the pin engaging end 21 of push rod 20 is formed with a conical recess 45. The cone angle of this recess 45 is so chosen that it corresponds generally to the angle of the taper of the ends 60 of the pin 9. The purpose of the conical recess 45 is to further facilitate compression of pin 9 to its fully compressed diameter and furthermore to help maintain the pin 9 in its compressed state just prior to and as the pin leaves internal bore 15.

Of course, after the pin has been inserted into the corresponding holes in the work, the pin will snap toward its uncompressed state and since, as above stated, the holes in the work are of smaller diameters than the uncompressed diameter of the pin, the pin will exert considerable pressure on the internal walls of the holes thereby maintaining the part securely fastened together.

The embodiment of the present invention illustrated in Figs. 8, 9 and 10 is for use primarily where the machine parts to be fastened together are not assembled with other apparatus at the time of the pin insertion operation. For this purpose, the anvil 2 of the tool illustrated in Fig. 1 is not necessarily required, inasmuch as the work may be placed in a V-block on an assembly bench.

In the embodiment of the present invention illustrated in Fig. 8, the shaft 5 and internal bores 7, 15 and 16 are identical to those illustrated in Fig. 1. Likewise, the push rod 20 and its pin engaging end portion 21 are also substantially identical to that illustrated in Fig. 1. However, in this embodiment, the push rod 20 is coupled with a relatively large diameter driving head portion 48. The coupling means between shaft 5 and head 48 is a spring 46 which is illustrated in its relaxed position in Fig. 8. Spring 46 is suitably fastened at opposite ends thereof to shaft 5 and driving head 48.

The operation of the modification of the tool illustrated in Fig. 8 will be described in connection with the insertion of pin 9 into corresponding holes in machine parts W. As in the case of the embodiment illustrated in Fig. 1, the operator pulls shaft 5 away from driving head portion 48 against the tension of spring 46 thereby allowing pin 9 to be inserted through guide slot 8 and into internal bore 7. Releasing shaft 5 allows spring 46 to force pin 9 toward tapered bore section 16, thus clamping pin 9 between tapered bore section 16 and the end portion 21 of push rod 20. The operator then inserts work-engaging end 6 of shaft 5 into a conical bore 50 in a suitable jig 49. It will be noted that conical bore 50 terminates in a short, straight bore section 51. Thus, with the tool in this position the operator taps head portion 48 with a hammer or mallet thus forcing pin 9 into bore section 15 in its compressed state. Continued tapping of head portion 48 will cause pin 9 to be forced into straight bore section 51 in jig 49 so that the pin 9 protrudes slightly from the end 6 of shaft 5. Since pin 49 is in its compressed state it exerts considerable force against the walls defined by bore 15 and therefore it will remain in this position as the tool is removed from jig 49.

The operator now places the machine part to be fastened together in a V-groove 53 formed in block 54. Since a pin 9 now protrudes slightly from the end 6 of shaft 5, the operator may insert this projection into the holes in work W. Again, tapping the head portion 48, the push rod 20 will force the pin 9 from internal bore 15 fully into the holes in the work W. As above, when the pin leaves bore section 15 it will expand from its fully compressed state toward its uncompressed state and thereby exert considerable pressure on the hole walls and thus firmly fasten the machine parts together.

The tool of the present invention may also be used for removing or ejecting pins from machine parts for the purpose of disassembly and/or replacement thereof. For example, the tool illustrated in Fig. 1 may be modified in the following manner so that it may be used as a pin ejector tool. The push rod 20, illustrated as having a relatively short end portion 21 used for inserting the pin as described above, may be replaced with another rod having a relatively long end portion such that this elongated end portion will extend through internal bore 15 to contact a pin already inserted within the machine parts. Thus, operation of the handles 22 and 24 in a manner set forth above will cause the elongated end portion to pass beyond the work-engaging end 6 of shaft 5 to thereby push the pin out of the holes in the parts. For this purpose, the anvil 2 of C-shaped frame 14 may be provided with a hole 14' axially aligned with the axis 4 of the tool through which the pin may pass as it is ejected from the machine parts.

Alternatively, and if the size of the tool permits, the end portion 21 to push rod 20 may be axially bored and tapped and an extension having a diameter equal to the diameter of the end portion 21 may be secured thereto, thus readily converting the tool for use as a pin ejector.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A tool for inserting fastening pins of the resilient, compressible-diameter type into corresponding holes in machine parts for the purpose of fastening said parts together, said pins being tapered at each end thereof and said holes having a diameter smaller than the uncompressed diameter of said pins, comprising a shaft having one end thereof adapted to engage said parts adjacent the holes therein, an axial bore in said shaft having a diameter substantially not less than the uncompressed diameter of said pins and adapted to receive a pin therein, said bore being tapered toward its discharge end to a diameter substantially equal to the fully compressed diameter of said pin, said taper generally conforming to the taper of said pin ends, a push rod translatably fitted within said axial bore and having a pin-engaging end portion of a diameter substantially not in excess of the diameter of said discharge end of said tapered bore portion, said end portion having a conically recessed face also generally conforming to the taper of said pin ends and adapted to engage a pin when disposed within said axial bore whereby upon translation of said push rod within said shaft and toward said machine parts said conical face and said tapered portion of said bore will uniformly radially compress said pin at both ends thereof and upon further translation of said push rod in the same direction will force said compressed pin into the holes of said machine parts in its fully compressed state.

2. A tool of the character set forth in claim 1 further comprising a spring operable between said shaft and said push rod for initially moving said pin toward and positively maintaining the same against said tapered bore portion.

3. A tool of the character set forth in claim 2 further comprising a generally C-shaped frame having a bore at one end thereof for slidably receiving said shaft and an anvil at the opposite end thereof axially aligned with said bore, said anvil being adapted to receive said machine parts with the axis of the holes therein substantially coincident with the axis of said frame bore, said shaft being axially movable toward said anvil, and means including pressure responsive means supported by said frame for applying a control pressure to said push rod toward said parts whereby said push rod will move said shaft into engagement with said parts and thereby arrest movement thereof and upon further application of pressure said push rod only will move thereby to force said pin into its compressed state into the holes in said machine parts.

References Cited in the file of this patent

UNITED STATES PATENTS

| 1,563,840 | Dirks | Dec. 1, 1925 |
| 2,269,963 | Wappler | Jan. 13, 1942 |
| 2,438,642 | Martin | Mar. 30, 1948 |
| 2,510,206 | Barkah et al. | June 6, 1950 |

FOREIGN PATENTS

| 311,712 | Germany | Apr. 7, 1914 |
| 25,908 | France | Mar. 6, 1923 |